United States Patent [19]
Allen et al.

[11] Patent Number: 5,644,139
[45] Date of Patent: Jul. 1, 1997

[54] NAVIGATION TECHNIQUE FOR DETECTING MOVEMENT OF NAVIGATION SENSORS RELATIVE TO AN OBJECT

[76] Inventors: Ross R. Allen, 408 Hainline Dr., Belmont, Calif. 94002; David Beard, 842 Los Robles, Palo Alto, Calif. 94306; Mark T. Smith, 726 Pico Ave., San Mateo, Calif. 94403; Barclay J. Tullis, 1795 Guinda St., Palo Alto, Calif. 94303

[21] Appl. No.: 696,713

[22] Filed: Aug. 14, 1996

Related U.S. Application Data

[62] Division of Ser. No. 396,826, Mar. 2, 1995, Pat. No. 5,578,813.

[51] Int. Cl.[6] .................................................. G06K 7/015
[52] U.S. Cl. .................. 250/557; 250/559.44; 364/449.1
[58] Field of Search ............................ 250/557, 556, 250/208.1, 235, 559.44; 364/449, 444, 460; 382/311–315; 235/462, 472

[56] References Cited

U.S. PATENT DOCUMENTS

| | | | |
|---|---|---|---|
| 4,494,201 | 1/1985 | Reymond et al. | 364/449 |
| 4,723,297 | 2/1988 | Postl | 382/46 |
| 4,797,544 | 1/1989 | Montgomery et al. | 250/221 |
| 4,951,214 | 8/1990 | Hollister | 364/460 |
| 5,023,922 | 6/1991 | Abramovitz et al. | 382/59 |
| 5,355,146 | 10/1994 | Chiu et al. | 345/156 |
| 5,497,150 | 3/1996 | Kimura et al. | 341/1 |

*Primary Examiner*—Que Le

[57] ABSTRACT

A scanning device and method for forming a scanned electronic image include using navigation information that is acquired along with image data, and then rectifying the image data based upon the navigation and image information. The navigation information is obtained in frames. The differences between consecutive frames are detected and accumulated, and this accumulated displacement value is representative of a position of the scanning device relative to a reference. The image data is then positioned-tagged using the position data obtained from the accumulated displacement value. To avoid the accumulation of errors, the accumulated displacement value obtained from consecutive frames is updated by comparing a current frame with a much earlier frame stored in memory and using the resulting difference as the displacement from the earlier frame. These larger displacement steps are then accumulated to determine the relative position of the scanning device.

25 Claims, 8 Drawing Sheets

NAVIGATION TECHNIQUE FOR DETECTING MOVEMENT OF NAVIGATION SENSORS RELATIVE TO AN OBJECT

CROSS REFERENCE TO RELATED APPLICATION(S)

This is a divisional of application Ser. No. 08/396,826 filed on Mar. 2, 1995, U.S. Pat. No. 5,578,813.

TECHNICAL FIELD

The present invention relates generally to devices and methods for forming scanned electronic images of originals and more particularly to scanning devices and methods that accommodate imprecise movements during image capture.

BACKGROUND ART

Scanners for electronically forming an image of an original are known. Typically, the captured image provided by a scanner is a pixel data array that is stored in memory in a digital format. A distortion-free image requires a faithful mapping of the original image to the pixel data array. Scanners typically include at least one means for imposing a mechanical constraint during the image capture process in order to maximize the likelihood of faithful mapping.

The four types of scanners known in the art are drum scanners, flatbed scanners, two-dimensional array scanners and hand scanners. Drum scanners attach the original to the surface of a cylindrical drum that rotates at a substantially fixed velocity. During the rotation of the drum, an image sensor is moved in a direction parallel to the rotational axis of the drum. The combination of the linear displacement of the image sensor and the rotation of the original on the drum allows the entire original to be scanned. At any moment during the imaging process, the current position within the pixel data array relative to the original can be determined by measuring the angular position of the drum and the translational position of the sensor. The position of the pixel data array with respect to the original is fixed as long as the original is properly attached to the drum, the drum rotation is properly controlled, and the sensor is properly controlled in its displacement along the linear path.

Flatbed scanners include a linear array sensor that is moved relative to the original along an axis that is perpendicular to the axis of the array. Thus, the position of the sensor in one dimension may be known by tracking the relative movement of the sensor. The position of the sensor in the perpendicular direction is implicitly fixed by addressing a particular array element at which intensity is to be measured. In one embodiment of the flatbed scanner, the original is placed on a transparent platen and the sensor, along with an image illumination source, is placed on a side of the platen opposite to the original. As long as the original is not moved relative to the platen, the pixel data array will be fixed with respect to the image to be captured. In another embodiment, the original is moved, rather than the sensor. This second embodiment is typical of facsimile machines. Precision paper transports provide a high degree of positional accuracy during the image-capture process.

Advantages of the drum and flatbed scanners include the ability to accommodate documents at least as large as A4, or 8.5"×11" paper. Moreover, some of these scanners can handle A1 paper in a single setup. However, the scanners are not generally portable, since they require a host computer for control, data storage and image manipulation.

Two-dimensional array scanners may be used in the absence of mechanical encoding constraints, and require only that the array and the original be held motionless during an exposure period. A two-dimensional array of photosensitive elements directly accomplishes the mapping of the image of the original into a pixel data array. However, because a single 300 dpi mapping of an 8.5"×11" original requires an image sensor having an array of 2500×3300 elements, i.e. 8.25 million pixels, these scanners are cost-prohibitive in most applications.

Conventional hand scanners require a user to move a linear array of electrooptical sensor elements over an original. The movement is by hand manipulation. Array-position information is determined using methods such as those employed in operation of a computer "mouse." As a linear sensor array is moved, the rotation of wheels, balls or rollers that are in contact with the original is sensed, and the position information is determined from the mechanical details of the rotation. In general, the surface of the mechanical element in contact with the original has a high coefficient of friction, e.g. rubber, so as to resist slip and skid. A cylindrical roller or two wheels connected by a rigid axle may be used to enforce a single translational degree of freedom during the scanning process. A straight-edge or other fixture is often used to fix the scan direction with respect to the original and to further enforce the translational constraint provided by the pair of wheels or the roller. Nevertheless, the position encoder approach is one that is often susceptible to slips and skips, so that the pixel data array loses its correspondence with the image on the original.

Hand scanners are typically connected directly to a personal computer for image data storage, processing, and use. Data rates from the image sensor tend to limit the scanning speed. The scanners provide feedback to the user, typically by means of green or red light emitting diodes, to maintain the appropriate speed for the desired image resolution. Some hand scanners use electromagnetic brakes to prevent the user from dragging the scanner over the image too rapidly, with the mechanical resistance increasing with increases in scanning speed.

Hand scanners utilize relatively small imaging arrays and generally cannot handle larger than A6 documents in a single pass. This requires stitching algorithms to join together multiple swaths of a larger document. Swath stitching is done in a separate operation by the personal computer. Scanning a multi-page business document or report with a hand scanner is a tedious process that often yields low-quality results.

As previously noted, some type of fixture is typically used with a hand scanner. In the absence of a fixture, there is a tendency to impose some rotation as the hand scanner is moved across an original. If the user's elbow is resting on a flat surface during movement of the scanner, the rotation is likely to have a radius defined by the distance between the scanner and the user's elbow. As a consequence, the scanned electronic image will be distorted. Other curvilinear movements during a swath of the scanner will also create distortions.

What is needed is a scanning device that accommodates curvilinear movement during a scanning process, with accommodation being achieved in a low-cost manner and with a high degree of correspondence between the original image and the resulting image.

SUMMARY OF THE INVENTION

A scanning device and method for forming a scanned electronic image include using navigation information that is acquired along with image data, and then rectifying the image data based upon the navigation and image information. The navigation information is obtained in frames. The differences between consecutive frames are detected and accumulated, and this accumulated displacement value is representative of a position of the scanning device relative to a reference. The image data is then positioned-tagged using the position data obtained from the accumulated displacement value. To avoid the accumulation of errors, the accumulated displacement value obtained from consecutive frames is updated by comparing a current frame with a much earlier frame stored in memory and using the resulting difference as the displacement from the earlier frame. These larger displacement steps are then accumulated to determine the relative position of the scanning device. In the preferred embodiment, the navigation information is acquired by means of at least one navigation sensor that detects inherent structure-related properties of an original being scanned. Movement of an image sensor along the original may be tracked by monitoring variations of the inherent structure-related properties as the image sensor is moved relative to the original. Preferably, the inherent structure-related properties that are monitored are inherent structural features, such as paper fibers, or other constituents of the original. Navigation may also be speckle-based, wherein movement of the image sensor along the original is tracked by monitoring variations of speckle patterns produced using coherent illumination for acquiring the navigation information.

"Inherent structure-related properties" are defined herein as properties of the original that are attributable to factors that are independent of forming image data and/or of systematic registration data on the original. The navigation information may be formed by generating a position signal that is responsive to detection of inherent structure-related properties, such as a position signal of speckle information or a position signal that permits tracking of individual inherent structural features. "Inherent structural features" are defined herein as those features of an original that are characteristic of processes of forming the original and are independent of forming image data and/or systematic registration data on the original. For example, if the original recorded media is a paper product, the inherent structural features of interest may be paper fibers. As another example, navigation of the image sensor across a glossy original or an overhead transparency film may be determined by tracking surface texture variations that affect specular fields. Typically, the inherent structural features are microscopic, e.g. between 10 and 40 µm, features of surface texture.

Thus, the contemplated approaches to acquiring navigation information vary in scope. In the broadest approach, there is no limitation to the sources of navigation information that is to be used to remove distortion artifacts of curvilinear and rotational movement of the scanning device along a scan path. The navigation signal may therefore be in the form of a position signal that is responsive to detection of image data on the original (e.g., identification of edges of text characters), with the position signal then being used in the manipulation of an image signal. A narrower second approach is one in which a position signal is responsive to detection of inherent-structure related properties, such as the properties that determine speckle patterns. The third approach is to track navigation of the scanning device by monitoring the positions of individual inherent structural features (e.g., paper fibers) over time. This third approach is the narrowest of the three, since it is actually a subcategory of the second approach.

In the preferred embodiment, the image sensor is a linear array of electrooptical elements, while the navigation approach utilizes at least one two-dimensional array of navigation sensor elements. By placing a separate two-dimensional navigation array at each end of the image sensor, the scanner is afforded three degrees of freedom of movement. If the original is planar, two of the degrees of freedom are translational and are perpendicular to each other within the plane of the original, while the third degree of freedom is rotational about the normal to the plane of the original. The accuracy of rotation tracking is enhanced by the use of two navigation arrays, with each array having a smaller array extent than would be necessary if only a single navigation array were used. While the preferred embodiment is one in which a navigation sensor is a two-dimensional array, linear arrays may also be used. Moreover, as will be described more fully below, navigation information for rectifying image data could feasibly be acquired by fixing other position-tracking means to the scanning device, including encoding wheels and balls, computer mice track balls, registration grid-detectors, accelerometers, mechanical linkages, non-contacting electromagnetic and electrostatic linkages and time-delay integration sensor arrays. In many of these alternative embodiments, navigation information for rectifying the image data is acquired in manners independent of any inherent structure-related properties of the original, since position tracking does not include image acquisition.

The navigation sensors are in a known position relative to the image sensor. Preferably, the navigation sensors are as close to the end points of the imaging sensor as possible, so that the navigation sensors are less susceptible to traveling beyond the edge of an original as the image array is moved. The image sensor forms a signal that is representative of an image of interest. Simultaneously, each navigation sensor forms a signal representative of the inherent structure-related properties of the original. The scanning device may be moved in a freehand meandering pattern, such as one of alternating left-to-right and right-to-left movements with descent along the original, with the device remaining in contact with the original. Each one of the side-to-side swaths should overlap a portion of the previous swath, so that the image may be manipulated with respect to position and stitched either during or following the scanning process. The manipulation of the image signal is a rectification of image data, with the rectification being based upon the relative movement between the navigation sensor or sensors and the inherent structure-related properties detected by the navigation sensors. The manipulation is a "rectification" of the image signal, i.e., an operation of arranging and modifying acquired image data based upon navigation data in order to achieve conformance between original and output images. The stitching is used to connect image data acquired during successive swaths.

Preferably, each navigation sensor includes one or more light sources designed to provide contrast dependent upon the inherent structure-related properties of the original. Emitted light may be in the visible range, but this is not essential. For example, "grazing" light that has large angles of incidence relative to the surface normal will interact with paper fibers at or near the surface of an original that is a paper product, creating contrast-enhancing shadows among the fibers. On the other hand, if the original has a glossy surface, such as a photographic print, a clay-coated paper or an overhead transparency film, normally incident light will produce an image in the specular field that has image-contrast features sufficient for purposes of navigation. Optical elements such as filters and one or more imaging lenses further improve detection of inherent structure-related properties.

An advantage of the invention is that the scanning device and method allow three degrees of freedom of movement of the scanning device while still affording quality image capture. Thus, a portable, pocket-sized scanning device may be manufactured and used in the absence of mechanical constraints, other than that afforded by contact with the surface of the original throughout the image capture process. In fact, for embodiments in which image rectification is provided by correlation of navigation images, the device-to-original contact constraint may be eliminated. Another advantage is that because the scanning device of the preferred embodiment forms an electronic image based upon detection of inherent structural features, large areas of "whitespace" between image features of the original will be preserved and therefore not result in the image features being moved closer together during a stitching step.

BEST MODE FOR CARRYING OUT THE INVENTION

Figure 1:
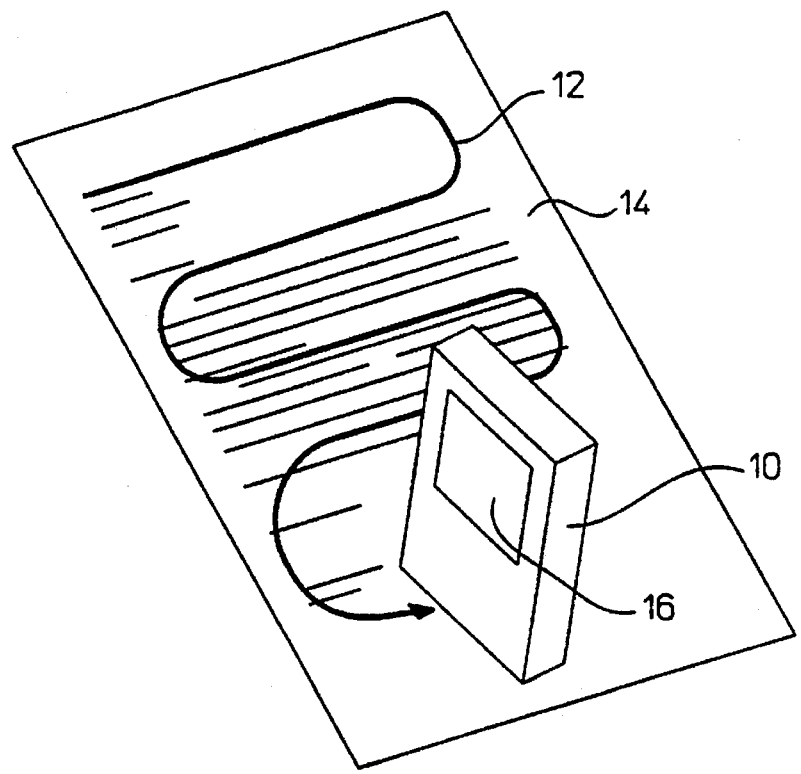
FIG. 1 is a perspective view of a hand-held scanning device following a meandering path on an original in accordance with the invention.

With reference to FIG. 1, a portable, hand-held scanning device 10 is shown as having followed a meandering path 12 along an original 14. In the preferred embodiment, the original is a piece of paper, an overhead transparency film, or any other image-bearing surface upon which inherent structure-related properties of the original generate sufficient contrast to provide position information during navigation along the meandering path. Typically, the positions of inherent structural features are tracked and the position information is used to rectify image data, but other embodiments will be described. The scanning device is preferably self-contained and battery powered, but may include a connection to an external source of power or to data ports of computers or networks.

The scanning device 10 of FIG. 1 includes an image display 16. The display may provide almost immediate viewing of a captured image. However, a display is not essential to the use of the scanning device.

The scanning device 10 allows three degrees of freedom, with two being in translation and one in rotation. The first degree is the side-to-side movement (X axis movement) along the original 14. The second degree of freedom is movement upwardly and downwardly along the original (Y axis movement). The third degree of freedom is the ability to operate the device with rotational misalignment of a linear array of image sensor elements relative to an edge of the original 14 (θ axis movement). That is, the linear array of imaging elements may have an angle of attack that is not perpendicular to the direction of device translation.

Figure 2:
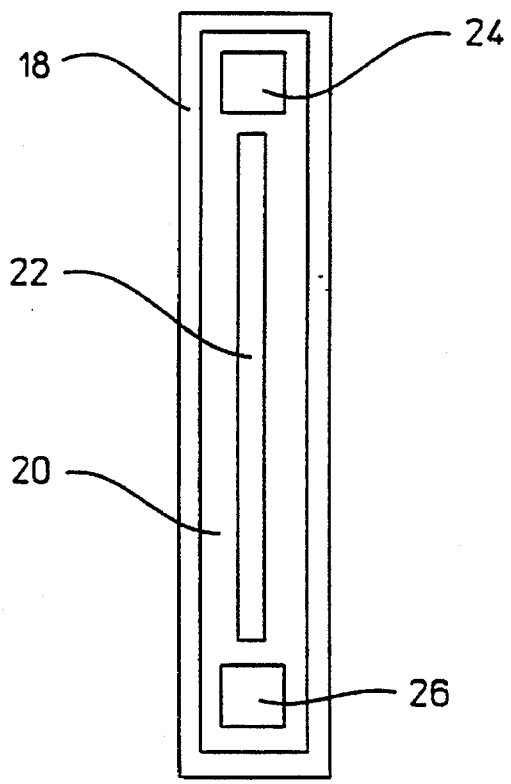
FIG. 2 is a rearward view of imaging and navigation sensors of the scanning device of FIG. 1.
Figure 3:
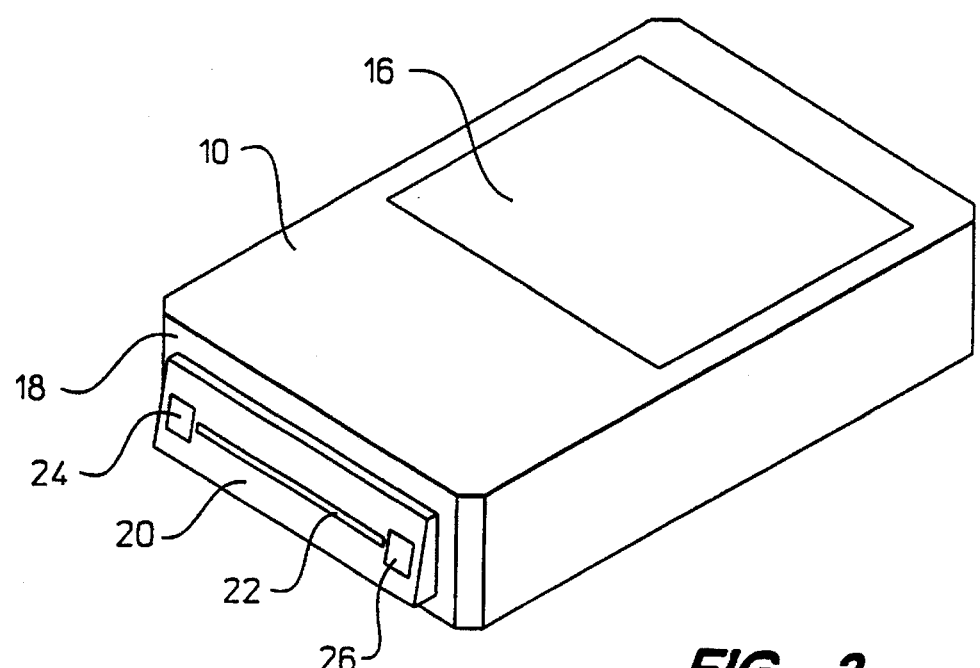
FIG. 3 is a perspective view of the scanning device of FIG. 1, shown with the imaging and navigation sensors exposed.

Referring now to FIGS. 1-3, the forward side 18 of the scanning device 10 includes a pivoting member 20 that aids in maintaining proper contact between the original 14 and an imaging sensor 22. Navigation sensors 24 and 26 are located at the opposed ends of the imaging sensor. Because the navigation sensors are mounted on the pivoting member, the navigation sensors are in a fixed location relative to the imaging sensor.

For reasons of physical compactness, the imaging sensor array 22 is preferably a contact image device, but for applications in which compactness is less of a concern or a smaller image is desired, sensors employing projection optics may be employed, with magnification less than unity. In such applications, the elements of the imaging sensor 22 should be smaller and more closely packed together. Contact imaging devices typically employ lenses sold under the trademark SELFOC, which is a federally registered mark of Nippon Sheet Glass Company Limited. Less conventionally, contact imaging can be obtained using interleaved array elements of sources and proximal sensors, without any imaging lenses. Conventional imaging sensors for scanning applications may be used. The imaging sensor may be part of a unit that also includes an illumination source, illumination optics, and image transfer optics.

The imaging sensor is shown as a linear array of discrete optically sensitive elements. The spacing of the elements plays a role in determining the spatial resolution of the scanner 10. For example, a linear array having a length of 101.6 mm requires 1200 sensor elements to achieve a resolution of 300 dpi. The sensor may be a charged coupled device, an amorphous silicon photodiode array, or any other type of linear array sensor known in the art.

A key consideration in the design of the imaging sensor unit is speed. The imaging sensor 22 preferably is able to image each pixel at approximately 10K samples per second. Linear imaging arrays generally produce a serial data stream, wherein pixel values, i.e. charges, are placed into a shift register and then shifted out. Achieving the desired speed requires either very fast serial transfer rates out of the entire image array or multiple taps, so that pixel values can be shifted through fewer cells. This introduces parallelism, which is advantageous for digital processing.

Another consequence of the speed requirement is that the products of pixel areas, at the surface of the original, and their solid angles of emitted light collected and conveyed to each array element should be sufficiently large to produce a detectable signal in integration times on the order of 100 microseconds. An enhancement option is to add an optical element to the sensor to increase the effective fraction of sensor pitch for which each sensing element is responsive. Since there is typically unused area in the array matrix, such light collection optics increase sensitivity.

A straightforward modification of the imaging sensor 22 enables sensing of color images. Three linear arrays parallel to one another, each with at least one embedded filter element that selectively passes red, green and blue components of the incident light respectively, would allow color imaging. Alternatively, a single array having broad-band sensitivity may be sequentially illuminated by red, green and blue light sources.

Regarding illumination for improving the operation of the imaging sensor 22, a linear array of high intensity light emitting diodes at the amber wavelength may be used. However, the selection of the preferred illumination source and any optical elements is dependent upon the medium of the original. The wave-length of the light is selected to maximize the contrast image data acquired during the scan of a given area of the original 14, while disregarding unwanted signals. Illumination optics may consist of LED dome lenses or may include a light pipe consisting of a precision-molded optical element that channels the illumination onto the original with a minimal amount of light loss. Such a design can afford a relatively uniform illumination of a target area of the original at a wide range of angles, but blocks normal incident rays in order to avoid specular surface reflections.

In FIG. 1, the meandering path 12 is shown as having four and a fraction swaths, i.e. side-to-side passes across the original 14. A useful imaging sensor 22 for most opportunistic applications has a length within the range of 25.4 mm and 101.6 mm. If the sensor 22 has a length of 63.5 mm, an A4 paper can be scanned in four or five swaths. As will be explained more fully below, the swaths should include regions of overlap, so that a stitching process can be used to produce a faithful reproduction of the original image.

The scanning device 10 typically includes at least one navigation sensor 24 or 26. In the preferred embodiment, the device includes a pair of navigation sensors, with the sensors being at opposite ends of the imaging sensor 22. While a one-dimensional array of optoelectronic elements may be used, in the preferred embodiment, each navigation sensor is a two-dimensional array of elements. The navigation sensors 24 and 26 are used to track movement of the scanning device 10 relative to the original 14.

In the preferred embodiment, each navigation sensor 24 and 26 captures images related to inherent structure-related properties of the original in order to produce information related to the position of the scanning device 10. For most prior art scanning devices, inherent structural features are considered to be noise. For the scanning device 10 of FIGS. 1-3, such features are noise with regard to the imaging sensor 22, but may be used to provide a basis for the navigation sensors 24 and 26 to generate position information. Useful, high-contrast images of surface texture can be generated by detecting structural variations that are inherent to the medium or are formed on the medium, e.g., text. For example, images may be formed based upon the contrast between shadows in valleys and bright spots at the peaks of inherent structural features. Such features are typically microscopic in nature, often ranging between 10 μm and 40 μm in size on common printed media. As an alternative, speckle may be used, since specular reflection of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

However, it is contemplated to use the invention for applications in which navigation information is independent of inherent structure-related properties of the original. For example, one or both of the navigation sensors 24 and 26 of FIG. 2 may be used to form successive images of print on the original, with correlation of the successive images being used to determine the position and the orientation of the image sensor 22 along the original 14. In this embodiment, all three sensors 22, 24 and 26 image text on the original, but only the signal from the sensor 22 is used to acquire image data. The signals from the navigation sensors 24 and 26 are used to acquire image-based navigation information.

Non-imaging approaches can also be used to acquire and process X, Y and theta position information. Unfortunately, many of the alternative means impose various limitations upon compactness, convenience of use, speed, freedom of motion, power consumption, accuracy, precision, and/or cost. One imaging-independent alternative available to acquiring position information is to provide one or more encoding wheels in place of the navigation sensors. The encoding wheels may then roll without slip upon the scanned surface, enabling the scanning device to travel along straight or curvilinear trajectories. It is not critical that the encoding wheels be on a common axis. The wheels may be mounted to swivel. Encoders coupled to monitor rotations would provide the input data from which to calculate position and orientation of an imaging sensor relative to a starting position and orientation.

Another image-free approach to acquiring navigation information is to use track balls similar to those for a computer mouse. A track ball could be used in place of each encoder wheel described above. Encoders would be used to obtain two-dimensional displacement information from each track ball. In another approach, optical or electronic (capacitive, resistive or inductive) sensors may be used in place of the navigation sensors of FIG. 2 in order to sense position and orientation relative to a cooperative (active or passive) grid or other reference constructed in an underlying tablet that, in turn, serves as a support for the original being scanned.

Another image-free approach to acquiring position and orientation information is to provide an accelerometer. An on-board inertial navigation platform may be used, with accelerations being sensed and integrated either once to obtain velocities or twice to obtain positions. Or velocities of spring-suspended masses could be sensed and integrated once in order to obtain positions. Gyroscopes could be employed in a direct sensing of orientation.

Yet another alternative approach would be to use any of a variety of mechanical linkages with which to track position and orientation relative to reference coordinates fixed with respect to the medium being scanned. Position and orientation information could be obtained by means of sensors coupled to measure the relative movement of the mechanical members. These sensors could be of either the relative or absolute type and could be based on direct position and orientation sensing, or the sensing of accelerations or velocities that would then be integrated with respect to time, once or twice, to obtain positions. Non-contacting remote sensing could also be used to measure position and orientation of the scanning device relative to reference coordinates fixed with respect to the scanned original. Examples of such non-contacting sensing would include those that use electromagnetic fields, waves or beams (e.g. at optical or radio frequencies); electric effects (e.g. capacitive); and/or magnetic effects (e.g. inductive). These approaches could utilize standard or differential Global Positioning technologies and potentially could use satellites. These approaches can also include traditional navigation/surveying methods, such as triangulations. They could also include techniques employed in robotics technologies, such as using shaped light beams and interpreting position from images of where these beams intercept the moving object.

The navigation sensors 24 and 26 of FIG. 2 effectively observe a moving image of the original 14 and produce an indication of the displacement in two planar dimensions between successive observations. As will be explained more fully below, pixel values from the navigation sensors are operated upon by processing elements to determine proper mapping of image data from the imaging sensor 22. The processing elements operate on a particular pixel and its nearest neighbors to produce an array of correlation values at each pixel location. The correlation values are based upon comparisons between a current image of the surface structure and a stored image representing a known position of inherent structural features, wherein the stored image serves as a position reference. However, operations other than the correlation process may be employed in manipulating the input image data to form the output image.

Figure 4:
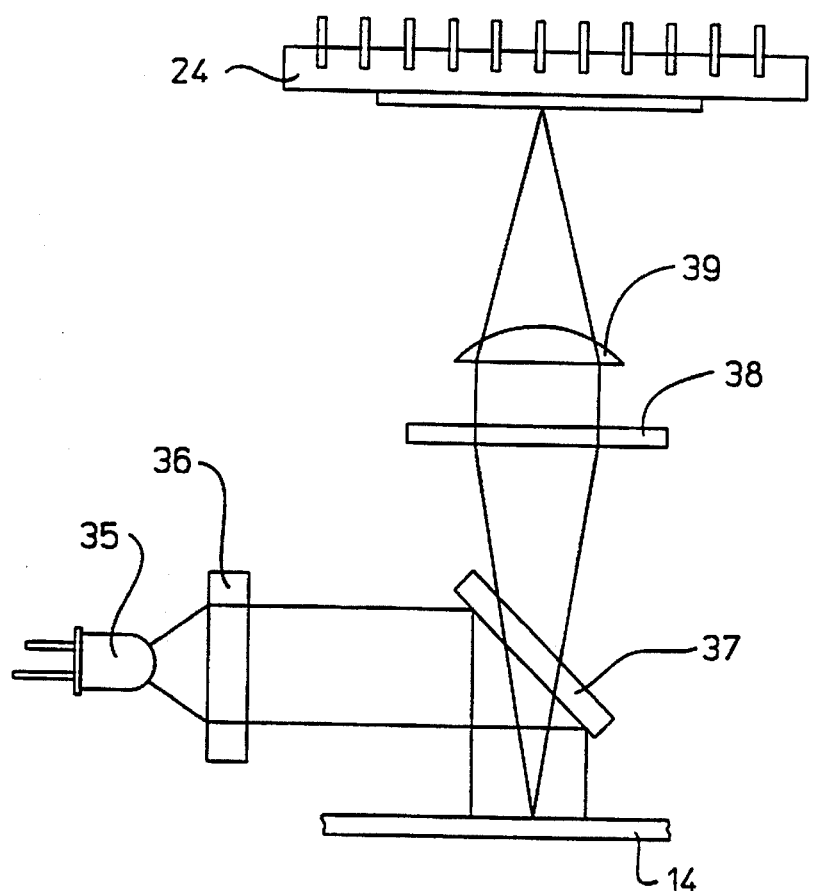
FIG. 4 is a schematical side view of an illumination system for one of the navigation sensors of FIG. 3.
Figure 5:
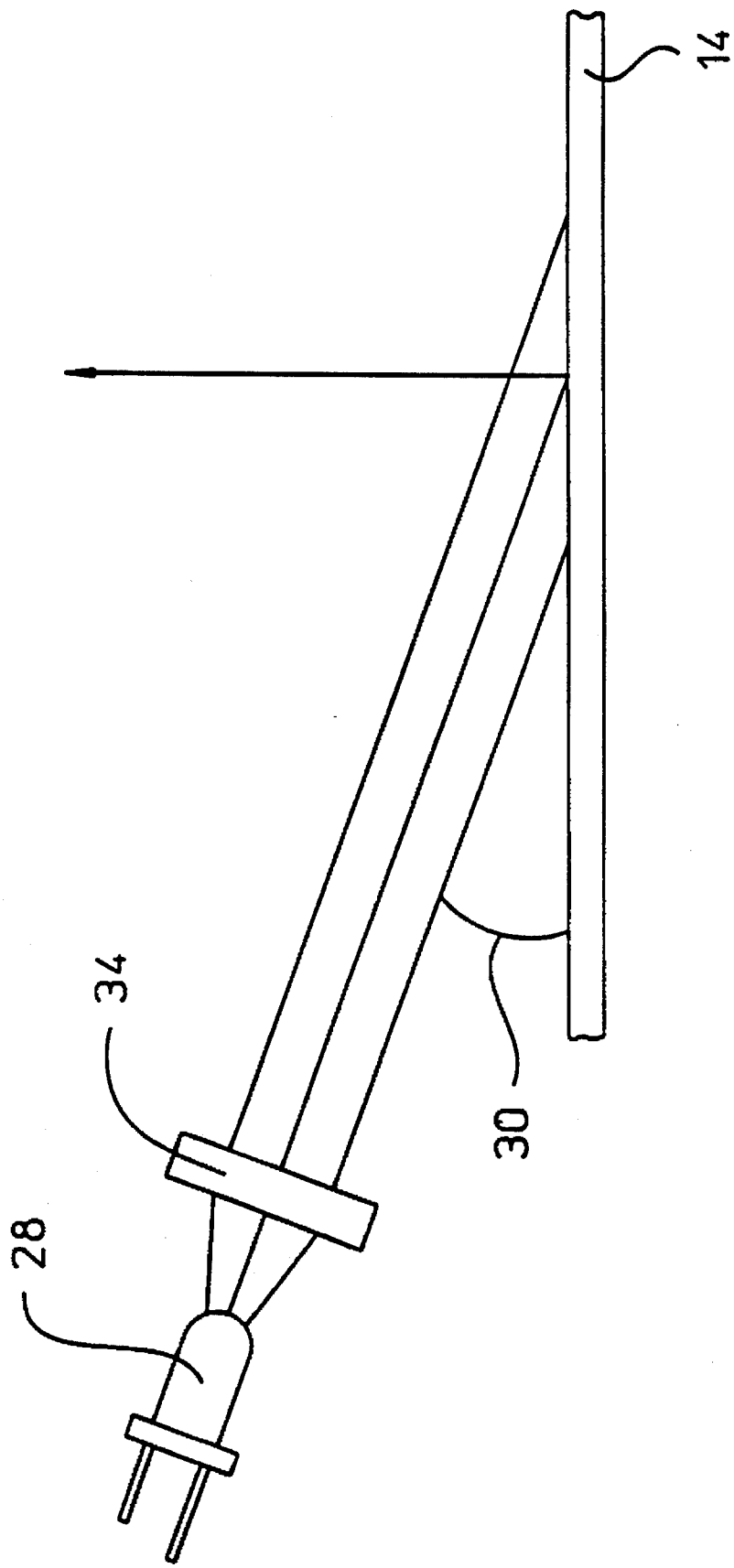
FIG. 5 is a side schematical view of a light emitting diode and optical elements for providing the illumination described with reference to FIG. 4.

Referring now to FIGS. 4 and 5, navigation sensor 24 is shown as being operatively associated with illumination optics. If the original 14 is a paper product for which paper fibers are to be detected by the navigation sensor 24, the introduction of light at a grazing angle of incidence is preferred. While not essential, one or more light emitting diodes (LEDs) 28 may be used. The grazing angle 30, which is the complement of the angle of incidence, is preferably in the range of zero degrees and fifteen degrees, but this may change depending upon the properties of the original 14. In FIG. 5, the source 28 is shown with illumination optics 34. The optics may comprise a single element or a combination of lenses, filters and/or holographic elements to accomplish suitable collimated and generally uniform illumination of the target surface. The wavelength of the light emitted by the source 28 should be selected to enhance the spatial frequency information available for navigation. Fixed pattern noise in the illumination field should be minimized. The output of source 28 may require adjustment to accommodate wide dynamic ranges of reflectivity of the medium as the scanning device proceeds over printed materials with absorbing or reflecting inks or other marking agents.

In FIG. 4, light from a source 35 is collimated at illumination optics 36 and then redirected by an amplitude splitting beam-splitter 37. That portion of the light energy from the LED directly to and transmitted through the beam-splitter is not shown in FIG. 4. The light energy from the beam-splitter illuminates the original 14 along the normal to the surface.

Also represented in FIG. 4 is the portion of the light energy that is reflected or scattered from the original 14 and passed through the beam-splitter 37 for aperturing and filtering at element 38 and focusing to an image at element 39. The portion of light energy passing from the original to the beam-splitter and reflecting from the beam-splitter is not shown. The magnification of navigation imaging optics should be constant over the field-of-view of the two-dimensional sensor array 24 which detects the focused light. In many applications, the modulation transfer functions, i.e. the amplitude measure of optical frequency response, of the navigation optics must be such as to provide attenuation before the Nyquist frequency that is determined by the pitch of the sensor elements of the navigation sensor and by the magnification of the optical elements. The optical elements should also be designed to prevent background illumination from creating noise. Note that a wavefront splitting beam-splitter could also be used.

The selection of the angle of incidence depends upon the material properties of the original. Grazing angles of illumination generate longer shadows and more apparent contrast, or AC signal if the surface of the original is not glossy. The DC signal level, however, increases as the illumination angle approaches the normal to the original.

Illuminating the target region of the original 14 at a grazing angle 30 works well for applications in which the surface of the original has a high degree of unevenness at the microscopic level. For example, the introduction of light from the source 28 at a grazing angle provides a high signal-to-noise ratio of data related to inherent structural features when the original is stationery, cardboard, fabric, or human skin. On the other hand, the use of incoherent light at a normal angle of incidence may be preferred in applications in which position data is needed to track scanner movement along such originals as photographs, glossy magazine pages, and overhead transparency films. With normal illumination, using incoherent light, viewing the original in the specularly reflected field will provide an image that is sufficiently rich in texture content to allow image and correlation-based navigation. The surface of the original has a microscopic relief such that the surface reflects light as if the surface were a mosaic of tiles, or facets. Many of the "tiles" of an original reflect light in directions slightly perturbed from the normal. A field of view that includes the scattered light and the specularly reflected light can thus be modeled as though the surface were composed of many such tiles, each tilted somewhat differently with respect to the normal. This modeling is similar to that of W. W. Barkas in an article entitled "Analysis of Light Scattered from a Surface of Low Gloss into Its Specular and Diffuse Components," in *Proc. Phys. Soc.*, Vol. 51, pages 274–292 (1939).

FIG. 4 shows illumination by a source 35 of incoherent light, which is directed along the normal of the surface of the original 14. FIG. 5 describes illumination at a grazing angle 30. In a third embodiment, no illumination is provided. Instead, the navigation information is accumulated using background light, i.e. light from the environment.

In a fourth embodiment, coherent illumination is introduced at normal incidence to permit speckle-based navigation. Relative motion between a scanning device and an original may be tracked by monitoring motion of speckle relative to the navigation sensors. If coherent illumination is used without using imaging optics, then by selecting a small area of illumination and by having a relatively large separation between the surface of the original and the photodetector array of the navigation sensor 24, the resulting predominant speckle cell sizes with coherent illumination are sufficiently large to satisfy the Nyquist sampling criterion. The use of a beam splitter allows the direction of both the incident illumination and the detected scatter to be near to normal to the surface of the original, as similarly accomplished in FIG. 4.

Figure 6:
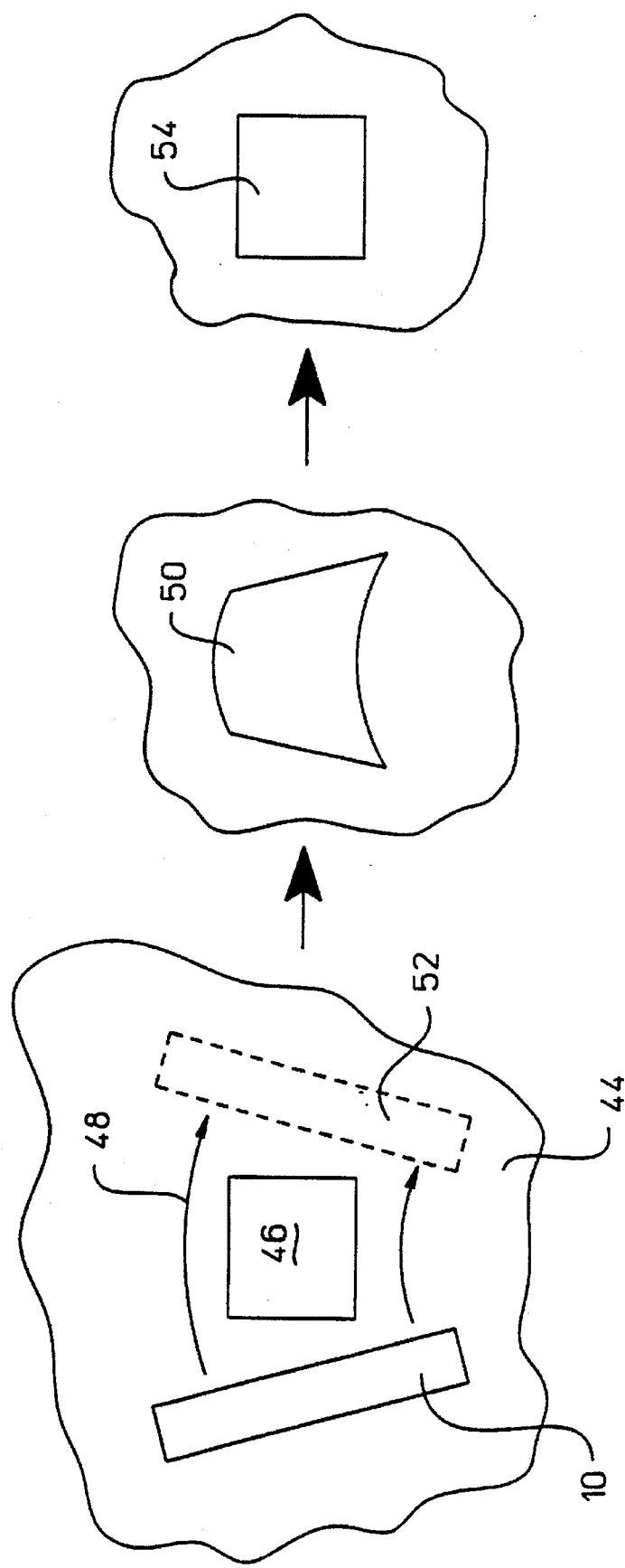
FIG. 6 is a conceptual view of the image capture operation of the scanning device of FIG. 1.

Referring now to FIG. 6, the scanner 10 is shown as being moved across an original 44 having a block 46 imprinted onto a surface of the original. Because the scanner 10 is not subjected to any kinematic constraints in the plane of the original, there is a tendency for a user to follow a curvilinear path across the original, as when the hand and forearm of the user rotate about the elbow. In FIG. 6, the scanning device is shown as following a curved path 48 across the block 46. If the lower edge of the scanning device is the edge that is closer to the elbow that defines the axis of rotation, the lower edge will have a shorter radius. Consequently, imaging elements of an imaging sensor will vary with respect to the time and distance required to pass over the block 46. A distorted image 50 of the block is captured as the device is moved to the second position 52, shown in dashed lines.

The captured image 50 would be the stored image in the absence of processing to be described below. However, as the imaging sensor captures data related to the block 46, navigation information is acquired. In the preferred embodiment, one or more navigation sensors capture data related to inherent structural features of the original 44. Movement of the inherent structural features relative to the scanning device 10 is tracked in order to determine displacement of the imaging sensor relative to the block 46. A faithful captured image 54 may then be formed. The image 54 is defined herein as the "rectified" image.

Figure 7:
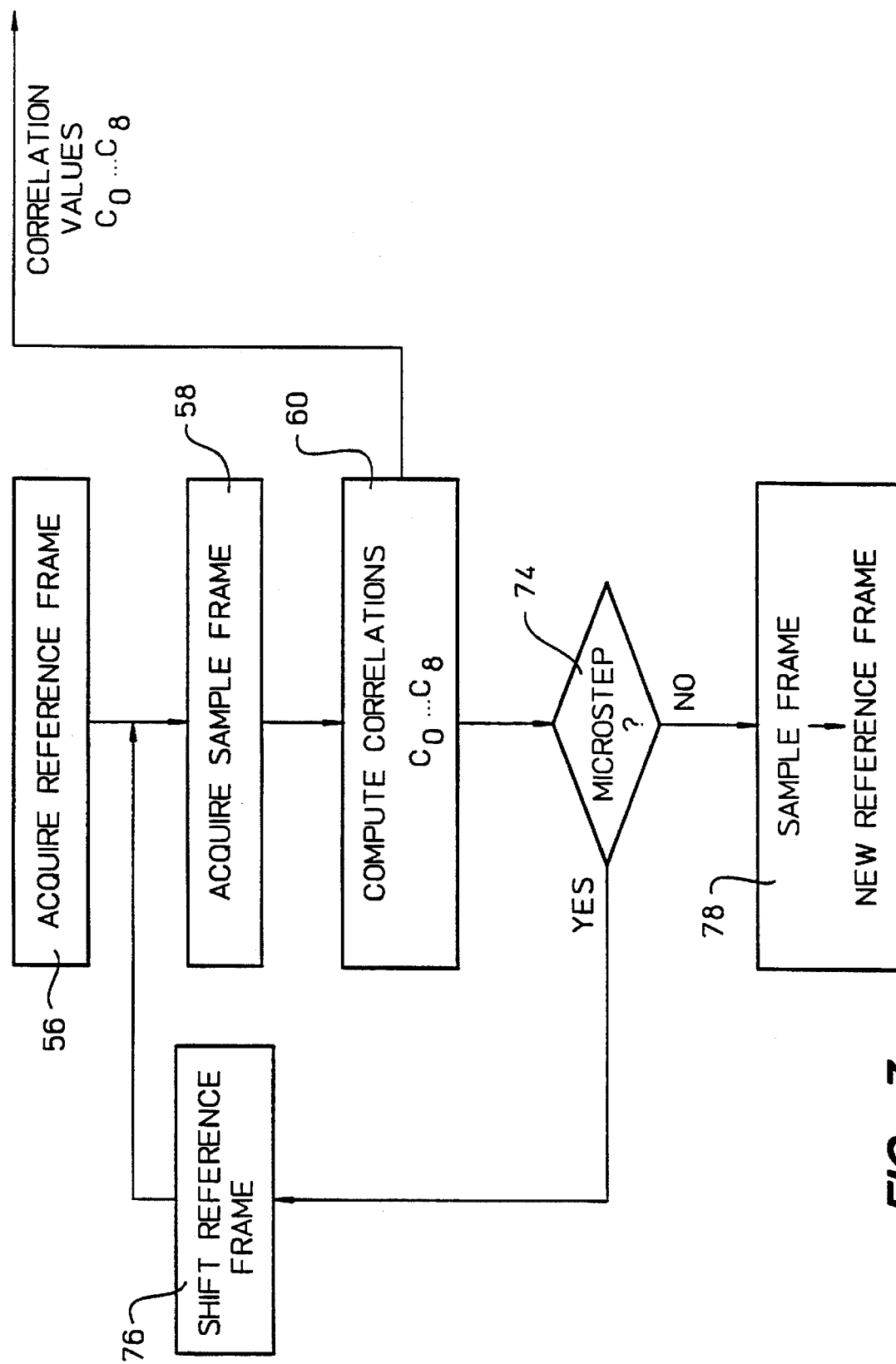
FIG. 7 is an operational view of one embodiment of the navigation processing of the scanning device of FIG. 1.

In FIG. 7, one embodiment of navigation processing is shown. The navigation processing is performed by correlating successive frames of navigation information, such as data related to inherent structural features. The correlations compare the positions of the inherent structural features in successive frames to provide information related to the position of a navigation sensor at a particular time. The navigation information is then used to rectify image data. The processing of FIG. 7 is typically performed for each navigation sensor.

In a first step 56, a reference frame is acquired. In effect, the reference frame is a start position. The position of a navigation sensor at a later time may be determined by acquiring 58 a sample frame of position data from the navigation sensor at the later time and then computing correlations 60 between the reference frame and the later-acquired sample frame.

Acquiring the initial reference frame 56 may take place upon initiation of the imaging process. For example, the acquisition may be triggered by mere placement of the scanning device into contact with the original. Alternatively, the scanning device may include a start button that initiates the image process and the navigation process. Initiation may also take place by a periodic pulsing of the illumination system of each navigator. If there is a reflected signal that exceeds a prescribed threshold of reflection or a correlation signal that indicates motion, the reference frame is then acquired.

While the navigation processing is performed computationally, the concepts of this embodiment may be described with reference to FIGS. 7 and 8. A reference frame 62 is shown as having an image of a T-shaped inherent structural feature 64. The size of the reference frame depends upon factors such as the maximum scanning speed of the scanning device, the dominant spatial frequencies in the imaging of the structural features, and the image resolution of the sensor. A practical size of the reference frame for a navigation sensor that is thirty-two pixels (N) by sixty-four pixels (M) is 24×56 pixels.

At a later time (dt) a navigation sensor acquires a sample frame 66 which is displaced with respect to frame 62, but which shows substantially the same inherent structural features. The duration dt is preferably set such that the relative displacement of the T-shaped feature 64 is less than one pixel of the navigation sensor at the velocity of translation of the scanning device. An acceptable time period is 50 μs for velocities of 0.45 meters/sec at 600 dpi. This relative displacement is referred to herein as a "microstep."

If the scanning device has moved during the time period between acquiring 56 the reference frame 62 and acquiring 58 the sample frame 66, the first and second images of the T-shaped feature will be ones in which the feature has shifted. While the preferred embodiment is one in which dt is less than the time that allows a full-pixel movement, the schematic representation of FIG. 8 is one in which the feature 64 is allowed to shift up and to the right by one pixel. The full-pixel shift is assumed only to simplify the representation.

Figure 8:
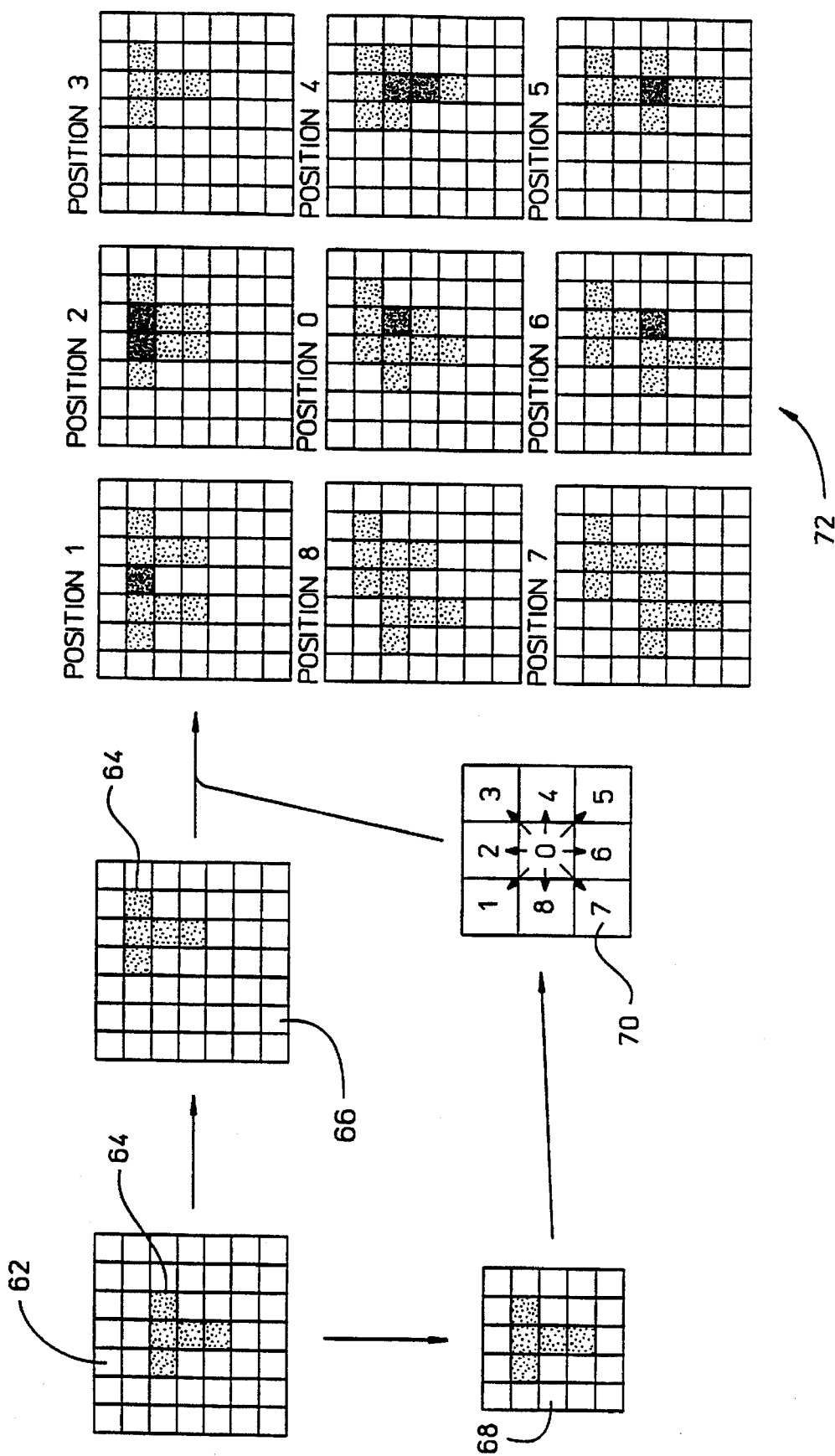
FIG. 8 is a schematical view of selected steps of FIG. 7.

Element 70 in FIG. 8 represents a sequential shifting of the pixel values of frame 68 into the eight nearest-neighbor pixels. That is, step "0" does not include a shift, step "1" is a diagonal shift upward and to the left, step "2" is an upward shift, etc. In this manner, the pixel-shifted frames can be combined with the sample frame 66 to produce the array 72 of position frames. The position frame designated as "Position 0" does not include a shift, so that the result is merely a combination of frames 66 and 68. "Position 3" has the minimum number of shaded pixels, and therefore is the frame with the highest correlation. Based upon the correlation results, the position of the T-shaped feature 64 in the sample frame 66 is determined to be a diagonal rightward and upward shift relative to the position of the same feature in earlier-acquired reference frame 62, which implies that the scanning device has moved leftwardly and downwardly during time dt.

While other correlation approaches may be employed, an acceptable approach is a "sum of the squared differences" correlation. For the embodiment of FIG. 8, there are nine correlation coefficients ($C_k = C_0, C_1 \ldots C_8$) formed from the nine offsets at element 70, with the correlation coefficients being determined by equation:

$$C_k = \sum_i \sum_j (S_{ij} - R_{(ij)+k})^2$$

where $S_{ij}$ denotes the navigation sensor-measured value at the position ij of the sample frame 66 and $R_{ij}$ denotes the navigation sensor-measured value at the frame 68 as shifted at the element 70 in the k direction, with k being the identifier of the shift at element 70. In FIG. 8, k=3 provides the correlation coefficient with the lowest value.

Correlations are used to find the locations of identical features in successive frames in order to determine the displacements of the features from frame-to-frame. Summing or integrating these displacements and correcting for scale factors introduced through the design of the relevant optics determine the displacements of the imaging sensor as a scanning procedure progresses.

As previously noted, the frame-to-frame correlations are referred to as "microsteps," since frame rates are chosen to be sufficiently high to ensure that the displacements do not exceed the dimension of a single pixel. Oversampling can provide sub-pixel displacement precision. Referring to FIG. 7, a determination 74 of whether a microstep is to be taken is made following each computation 64 of the correlations. If a microstep is required, the reference frame is shifted at 76. In this step, the sample frame 66 of FIG. 8 becomes the reference frame and a new sample frame is acquired. The correlation computation is then repeated.

While the process provides a high degree of correlation match, any errors that do occur will accumulate with each successive shift 76 of a sample frame 66 to the reference frame designation. In order to place a restriction on the growth rate of this "random walk" error, a sample frame is stored in a separate buffer memory. This separately stored sample frame becomes a new reference frame for a subsequent series of correlation computations. The latter correlation is referred to as a "macrostep."

By using macrosteps, a more precise determination of scanner displacement across a distance of m image frame displacements, i.e. m microsteps, can be obtained. The error in one macrostep is a result of a single correlation calculation, whereas the equivalent error of m microsteps is $m^{1/2}$ times the error in a single microstep. Although the average of errors in m microsteps approaches zero as m increases, the standard deviation in the average of errors grows as $m^{1/2}$. Thus, it is advantageous to reduce the standard deviation of accumulated error by using macrosteps having m as large as practical, as long as the two frames that define a macrostep are not so far spaced from one another that they have no significant region of common image content.

The sampling period dt does not have to be constant. The sampling period may be determined as a function of previous measurements. One method that employs a variable dt is to improve the accuracy of displacement calculation by keeping the relative displacement between successive reference frames within certain bounds. For example, the upper bound may be one-pixel displacement, while the lower bound is determined by numerical roundoff considerations in the processing of the navigation data.

Figure 9:
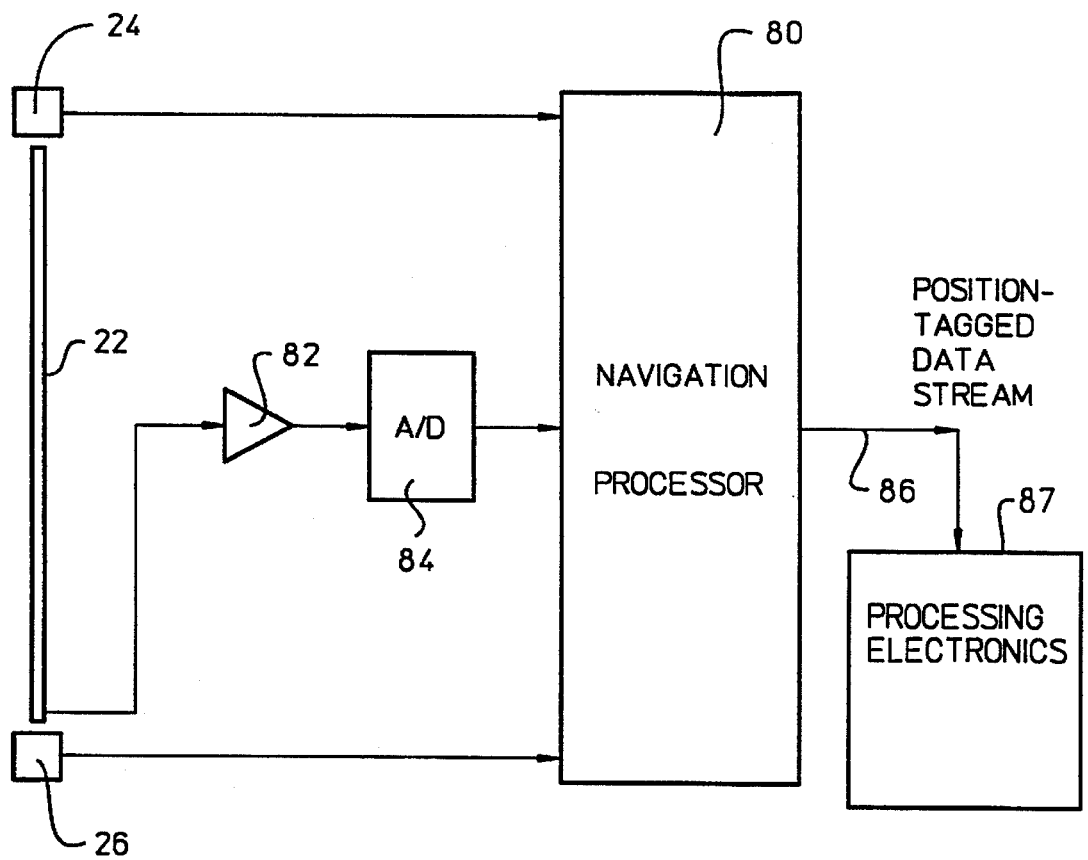
FIG. 9 is a block diagram of the components for carrying out the steps of FIG. 8.
Figure 10:
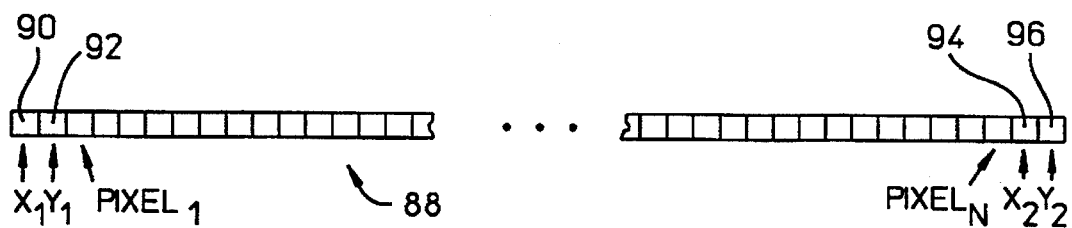
FIG. 10 is a representation of a position-tagged data stream typical of that output from FIG. 9

Referring again to FIG. 9, the image signal generated at the imaging sensor 22 may then be "position-tagged" based upon the navigation data. In one embodiment, pixel values from the two navigation sensors 24 and 26 are received by a navigation processor 80 for performing the operations of FIGS. 7 and 8. Based upon the computed correlations, coordinates are determined for the current position of the first navigation sensor 24 ($X_1$, $Y_1$) and for the current position of the second navigation sensor 26 ($X_2$, $Y_2$). The navigation processor 80 also receives pixel values of the imaging sensor 22 via a pixel amplifier 82 and an analog-to-digital converter 84. Although FIG. 9 shows only a single tap from the image sensor 22 and a single A/D converter 84, multiple taps, each with an A/D converter, are within the scope of the invention. The current position coordinates of the navigation sensors are "tagged" at the ends of a line of data that corresponds to the number of pixels within the imaging sensor. The output 86 of the navigation processor 80 is therefore a position-tagged data stream. In FIG. 10 an increment 88 of the data stream is shown as having position coordinate cells 90, 92, 94 and 96 at the opposite ends of N pixel cells, although this ordering is not essential.

The position-tagged data stream at the output 86 of the navigation processor 80 may be first stored in image space that allows the image to fill memory locations which provide continuity in both the X and Y axes. Consequently, image acquisition is not restricted to scanning from an upper-left corner of an original to the lower-right corner. Because each image pixel is associated with a relative (X,Y) displacement from an arbitrary starting point, the image can expand in X and Y to the full size of the image memory.

The imaging sensor 22 is clocked as the scanning device moves across an original. The clocking ensures that the fastest moving element of the sensor samples at least once per pixel displacement. As previously noted with reference to FIG. 6, in the case of significant curvature of the scanning device 10 during image capture, one end of the imaging array will translate more rapidly than the other end, causing pixels at the slower end to be oversampled. This situation can be handled by either recording the most recent reading (for grayscales) or by recording in a logical OR mode (for binary images) at a specific pixel location in image space.

The next operation is to map the position-tagged increments. In one embodiment, the end points of the increments are joined by a line. Since the distance of each pixel of the imaging sensor 22 is fixed, the physical location of the pixels relative to the line can be calculated. One approach for determining the physical locations of each pixel is a modification of the Bresenham Raster Line Technique. The modification is that because the array of pixels in the imaging sensor is fixed, the line loop will be fixed at that same number. That is, the usual Bresenham algorithm is one in which the number of iterations in the line loop is the greater of delta_x and delta_y, i.e., max (delta_x, delta_y), but for the modified algorithm the number (N) of pixels along the array is used where max (delta_x, delta_y) is customarily used, so that the loop runs N times. The following program element describes this algorithm:

```
/************************************************************
  Load pixel values with get_pixel( ) using location pairs
  (xa,ya) and (xb,yb) of the endpoints of an N-element array
  of pixel values using a modified Bresenham line draw
  algorithm
*************************************************************/
delta_x = xb - xa;
delta_y = yb - ya;
inc_x = (delta_x > 0) - (delta_x < 0);
/* increments are +1 or -1 */
inc_y = (delta_y > 0) - (delta_y < 0);
delta_x *= inc_x; /* take absolute values */
delta_y *= inc_y;
x = xa;
y = ya;
x_err = 0;
y_err = 0;
for (i = 0; i < N; i++)
{ get_pixel(i / 2, x / 2, y / 2);
  x_err += delta_x;
  y_err += delta_y;
  if (x_err >= N)
  { x_err -= N;
    x += inc_x;
  }
  if (y_err >= N)
  { y_err -= N;
    y += inc_y;
  }
}
```

Thus, given two points on a raster (xa, ya) and (xb, yb) which are the end points of an imaging sensor of N pixels, the purpose is to find successively the points (x, y) on the raster where each pixel is to be read. These points form the best approximation to a straight line connecting the end points at a and b. Take the differences in x and y. From the sign of the distances between a and b, determine whether x and y will be incremented or decremented as the line is traversed. Start at x=xa, y=ya, with two error registers x_err and y_err set to zero and begin the loop. Next, read the value at (x, y) and write it to the output raster using get_pixel(). Given a linear image sensor with half the resolution of the navigation, use i/2, x/2, y/2 for the pixel number in the sensor and the position in the output raster. Add delta_x and delta_y to the respective error registers, then test both error registers to see if they exceed N. If so, subtract N from them and change x and/or y by the increment. If an error register does not exceed the N, continue to use the current value of x or y. The process continues until the loop has run N times.

The next step is to stitch successive image swaths within their region of overlap. This must be done in such a way as to identify and correct most of the accumulated navigation error and to mask any residual error. This "masking" can be done in areas of black print on a white background, for example, by stitching only in white space areas, i.e. areas with intensity values above a pre-described or adaptive threshold. The following paragraphs describe how redundant data from areas of overlap is identified (to be discarded) and how the navigation error is measured and corrected.

Techniques for stitching image swaths are known in the scanning art. These techniques typically require a pair of complete image swaths and produce a single, global transformation which brings the two swaths into registration. In this case, however, continuous navigation data provides the registration information needed for stitching. Since the navigation signal tends to accumulate error, it is continually amended by feeding back a correction signal derived from analysis of feature offsets.

Figure 11:
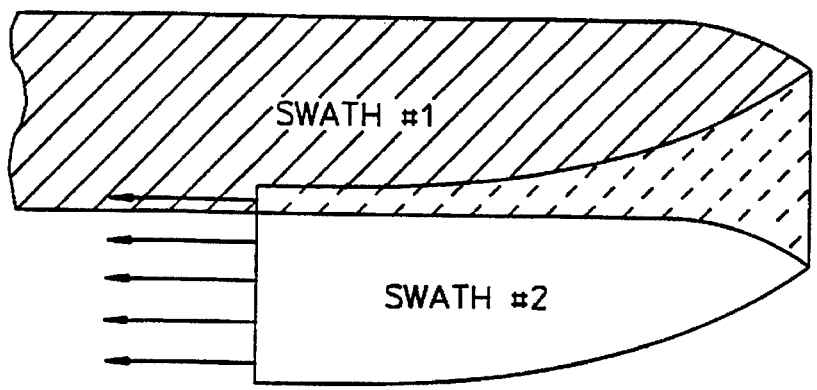
FIGS. 11 and 12 are representations of swaths by the scanning device of FIG. 1.
Figure 12:
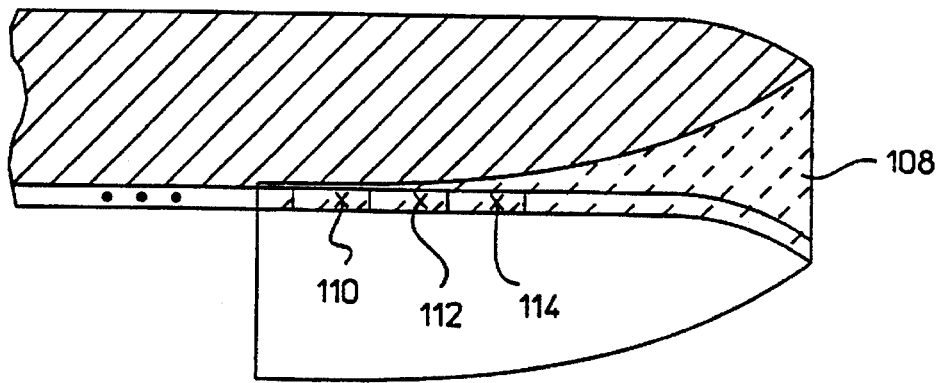

Some area of overlap is necessary in order to stitch two image swaths, since the navigation correction is calculated by correlating features within this area. Consider the situation portrayed in FIG. 11, where the Swath #1 is being resampled by the return pass, Swath #2. At time T, a partial swath has thus far been scanned. FIG. 12 highlights this overlap area 108. As shown in FIG. 12, during collection of Swath #1, quadrilateral image segments (henceforth called "registration tiles") are periodically labeled along the lower edge of the swath with the location of Tags 110, 112 and 114 that are described above. On a later pass (Swath #2) the "Surplus Overlap Area" 108 above the tagged areas of Swath #1 is clipped, using navigation information to determine where to clip. As each segment length in Swath #2 is acquired, the registration tile from Swath #1 is located in the top of what remains of Swath #2, after the "surplus" has been clipped. If the navigation data is perfect, there will be no offset between the location of Tag #1 and the location of that tile's rescanned image in Swath #2. More realistically, some navigation error will have accumulated since the last registration was performed. The offset between these two tiles produces a correction factor which is then used to update future navigation position-tags, associated with the data, in order to minimize the total accumulated error. In this way the total accumulated error in the navigation data is prevented from growing so large that it introduces an obvious distortion in the region of the swath overlap.

Since both Swath #1 and Swath #2 are combined to produce a single image, a buffer is used to temporarily store a copy of an original registration tile until Swath #2 has been located in it. The entire registration tile could be used for this correlation, but in the preferred embodiment a small area of high-frequency contrast (henceforth called a "feature") consisting of a rectangular tile (e.g., 15×15 pixels) of grey scale image is located within the registration tile of Swath #1 and saved to buffer. When the location of this feature is crossed for a second time, the offset between the location of the saved feature and the same feature in Swath #2 produces a navigation correction signal, i.e. the translation required to bring the two features into close correspondence. While other correlation approaches could be employed, an acceptable approach is a "sum of squared difference" correlation. A small search area is defined around the original location of the feature and correlation coefficients are determined by equation:

$$C_{k,l} = \sum_i \sum_j (T_{i,j} - I_{i+k,j+l})^2$$

where $T_{i,j}$ denotes the grey scale values of the feature from Swath #1 and $I_{i+k,j+l}$ denotes the grey scale values of the newly acquired feature from Swath #2. Indices i and j specify locations within the features, while k and l specify the magnitude of the proposed translational offset (constrained to remain within the search space). The smallest element in the resulting correlation array denotes the offset between the two features. Sub-pixel positional accuracy my be obtained using interpolation to find the minima of this bowl-shaped result.

Figure 13:
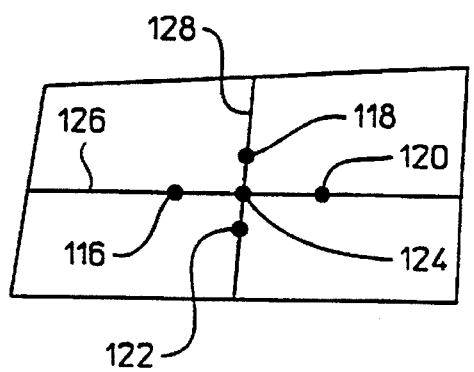
FIG. 13 is a representation of a registration tile that may be utilized to achieve stitching of successive swatches.

The feature within the registration tile is selected to maximize image variance, since this improves the accuracy of the correlation method. In one possible embodiment, only a subset of locations within the region is considered. These locations 116, 118, 120, 122 and 124 are shown in FIG. 13 as lying along the principal axes 126 and 128 of the registration tile (lines joining opposite midpoints of lines that define the region) and are sampled at the intersection and halfway between the intersection and each endpoint of the axis. For each location 116, 118, 120, 122 and 124, the variance $VAR_{k,l}$ is calculated using the equations:

$$SUM_{k,l} = \sum_i \sum_j I_{k+i,l+j}$$

$$SUM2_{k,l} = \sum_i \sum_j (I_{k+i,l+j})^2$$

$$VAR_{k,l} = SUM2_{k,l}/N - (SUM_{k,l})^2/N^2$$

In order to prevent obvious distortions in the final representative image, the error estimate is applied slowly; the "position-tags" are modified in small fixed magnitude steps as each new row of linear sensor data is loaded into memory, until there has been an accounting for the entire error.

In the preferred embodiment, the processing electronics for image reconstruction, stitching and image management is contained within the housing that defines the scanning device 10 of FIG. 1. Thus, the scanned image may be immediately presented at the image display 16. However, the scanning device may contain memory to store the position-tagged image data, but without processing and file management electronics and firmware.

As noted in reference to FIG. 3, the navigation and imaging sensors 22, 24 and 26 are preferably mounted on a pivoting member 20. In one embodiment, the pivoting member is connected to the remainder of the housing by at least one elastomer for which one end of the elastomer is connected to the stationary portion of the housing and the other end is connected to the pivoting member. The elastomer acts as a hinge. Thus, the pivoting portion is allowed to "float" without the use of frictional elements. Power, control and data signals may be conducted to the sensors via flex cables that are shielded in order to minimize electromagnetic interference. Other methods of pivotally attaching the pivoting member can be used. If the pivoting member is deleted and the sensors are in a fixed position on the housing, care must be taken not to tilt the scanning device 10 excessively during image capture. In this embodiment, the design of illumination and optical elements must be given increased attention.

While the invention has been described and illustrated as one in which a planar original is scanned, this is not critical. In fact, persons skilled in the art will readily understand how many of the techniques may be used for scanning three-dimensional images. However, the preferred embodiment is one in which the image of interest is formed on a medium, such as a piece of paper, a transparency, or a photograph, and the scanning device is in contact with the medium.

We claim:

1. A method of operating a detecting device comprising the steps of:
   generating electrical signals, representative of a position, by a navigation sensor, said electrical signals providing sequential frames of navigational information at time intervals;
   storing a first frame of navigational information generated at time N in a first memory buffer;
   storing successive frames of navigational information, subsequent to said first frame, in a second memory buffer;

comparing a current frame of navigational information generated at time M to a previous frame, immediately preceding said current frame, stored in said second memory buffer and generating a first displacement value representative of a difference between said current frame and said frame of navigational information immediately preceding said current frame;

processing data based on said first displacement value to take into account movement of said navigation sensor relative to a reference when processing said data;

comparing a current frame of navigational information generated at time T, subsequent to time M, to said first frame of navigational information stored in said first memory buffer and generating a second displacement value representative of a difference between said current frame generated at time T and said first frame;

processing data based on said second displacement value so that said data is not affected by accumulated errors from other displacement values; and storing a current frame of navigational information generated at time V, subsequent to time T, in said first memory buffer for comparison to a later frame of navigational information.

2. The method of claim 1 wherein said navigation sensor comprises a two-dimensional array of optical elements, each optical element generating a signal representative of a pixel.

3. The method of claim 2 wherein each of said time intervals is set so that successive frames have less than one pixel displacement at an anticipated displacement speed of said navigation sensor.

4. The method of claim 2 wherein said navigation sensor detects inherent structure-related properties of a medium over which said navigation sensor is passed.

5. The method of claim 2 wherein said step of comparing a current frame generated at time M to said previous frame comprises comparing signals from individual pixels with previous signals from each of said individual pixels and its nearest neighbors representative of a preceding frame.

6. The method of claim 1 further comprising the step of scanning said navigation sensor over a medium containing an image.

7. The method of claim 6 wherein said image is illuminated using background light, and said navigation sensor optically detects said medium using said background light.

8. The method of claim 1 wherein said navigation sensor comprises a receiver for Global Positioning System signals.

9. The method of claim 1 wherein said navigation sensor senses displacement of said navigation sensor relative to an object in two dimensions.

10. The method of claim 1 wherein said steps of processing said data based on said first displacement value and processing data based on said second displacement value comprise associating said data with position information obtained from said navigational information.

11. The method of claim 10 further comprising the step of mapping said data into a third memory buffer based on said position information.

12. The method of claim 1 wherein said step of processing data based on said first displacement value comprises the steps of accumulating displacement values, including said first displacement value, indicative of a total displacement of said navigation sensor with respect to a reference position over greater than two successive frames and processing said data based on accumulated displacement values.

13. The method of claim 1 wherein said step of processing data based on said second displacement value comprises the steps of accumulating displacement values, including said second displacement value, indicative of a total displacement of said navigation sensor with respect to a reference position over greater than two successive frames and processing said data based on accumulated displacement values.

14. A detecting device comprising:

a navigation sensor for generating electrical signals representative of a position, said electrical signals providing sequential frames of navigational information at time intervals;

a first memory buffer for storing a first frame of navigational information generated at time N;

a second memory buffer for storing successive frames of navigational information, subsequent to said first frame;

a displacement detecting circuit for comparing a current frame of navigational information generated at time M to a previous frame, immediately preceding said current frame, stored in said second memory buffer and for generating a first displacement value representative of a difference between said current frame and said frame of navigational information immediately preceding said current frame;

a processor for processing data based on said first displacement value to take into account movement of said navigation sensor relative to a reference when processing said data;

a displacement detecting circuit for comparing a current frame of navigational information generated at time T, subsequent to time M, to said first frame of navigational information stored in said first memory buffer and generating a second displacement value representative of a difference between said current frame generated at time T and said first frame; and a processor for processing data based on said second displacement value so that said data is not affected by accumulated errors from other displacement values.

15. The detecting device of claim 14 wherein said processor for processing said data based on said first displacement value and said processor for processing said data based on said second displacement value are the same processor.

16. The detecting device of claim 14 wherein said processor for processing said data based on said first displacement value and said processor for processing said data based on said second displacement value generate a position-tagged data stream for associating said data with a position relative to a reference.

17. The detecting device of claim 16 further comprising a third memory buffer for storing data mapped into said third memory buffer in accordance with a relative position.

18. The detecting device of claim 14 wherein said navigation sensor comprises a two-dimensional array of optical elements, each optical element generating a signal representative of a pixel.

19. The detecting device of claim 18 wherein said processor for processing data based on said first displacement value compares a current frame, generated by signals from individual pixels, with previous signals from each of said individual pixels and its nearest neighbors representative of a preceding frame.

20. The detecting device of claim 14 further comprising a timer for setting said time intervals so that successive frames have less than one pixel displacement at an anticipated displacement speed of said navigation sensor.

21. The detecting device of claim 14 further comprising a circuit for determining when said first memory buffer is to be updated with a new frame, said circuit ensuring that navigational information in said current frame generated at time T is in common with at least some navigation information in said first frame prior to said first memory buffer being updated with said new frame.

22. The detecting device of claim 14 wherein said navigation sensor comprises a receiver for Global Positioning System signals.

23. The detecting device to claim 14 wherein both of said displacement detecting circuitry also detect rotational movement of said navigation sensor with respect to a reference.

24. The detecting device of claim 23 further comprising a second navigation sensor for sensing, in combination with said navigation sensor, said rotational movement.

25. The detecting device of claim 14 further comprising:
an accumulator for accumulating displacement values indicative of a total displacement of said navigation sensor with respect to a reference position over greater than two successive frames; and
a processor for processing said data based on accumulated displacement values.

* * * * *